Jan. 19, 1960 H. C. A. VAN DUUREN ET AL 2,922,034

ELECTRONIC DISTRIBUTOR CIRCUIT

Filed Sept. 7, 1954 3 Sheets-Sheet 1

INVENTORS.

Hendrik Cornelis Anthony van Duuren

Antonie Snijders

By Brown, Jackson, Boettcher & Dienner Attys.

Jan. 19, 1960 H. C. A. VAN DUUREN ET AL 2,922,034

ELECTRONIC DISTRIBUTOR CIRCUIT

Filed Sept. 7, 1954 3 Sheets-Sheet 2

*INVENTORS.*

Hendrik Cornelis Anthony van Duuren

Antonie Snijders

BY Brown, Jackson, Boettcher & Dienner Att'ys.

INVENTORS.

Hendrik Cornelis Anthony van Duuren
Antonie Snijders
By Brown, Jackson, Boettcher & Dienner Attys

United States Patent Office 2,922,034

Patented Jan. 19, 1960

2,922,034

ELECTRONIC DISTRIBUTOR CIRCUIT

Hendrik Cornelis Anthony Van Duuren, Wassenaar, and Antonie Snijders, The Hague, Netherlands, assignors to Staatsbedrijf der Posterijen, Telegrafie en Telefonie, The Hague, Netherlands

Application September 7, 1954, Serial No. 454,555

Claims priority, application Netherlands September 10, 1953

17 Claims. (Cl. 250—27)

The invention relates to an electronic counting circuit having with a number of counting tubes$=n$ a number of staple states$=s$ in which $p$ tubes are conductive at a time, the other $n-p$ tubes being non-conductive. The number of states the circuit can assume in this way amounts to $$\frac{n!}{p!.(n-p)!}$$

at the most, this being the number of combinations $p$ or $n-p$ out of $n$ elements. In this respect the invention is distinguished from conventional circuits in that both $p$ and $n-p$ are larger than unity. In the well-known decade counting circuit, in which with ten states one out of ten tubes is conductive each state requires a tube. According to the invention the number of states per tube is larger. Thus for a decimal counter five tubes will do, of which either two, or three are conductive at a time.

For either of these complementary possibilities the largest number of states is $$\frac{5!}{2!3!}=10$$

Consequently, the loading per tube, necessary for locking the non-conductive tubes (or in a reciprocal circuit the conductive tubes) will be smaller.

The circuit according to the invention is further distinguished from the binary counting circuit (including the basic element thereof: the trigger) in that the latter, comprising $2n$ tubes, has a maximum number of states $=2^n$, whereas in the case of $n$ tubes being conductive simultaneously out of a total of $2n$, the number of states will be $$\frac{2n!}{n!n!}$$

Moreover, the circuit according to the invention can easily be made to go through the various states in a beforehand arbitrarily determined order of succession, or to go through a smaller number of positions than the largest possible number, whereas with the counting circuit based on the binary system this can only be realized with special means or even with additional tubes.

By way of example a comparison may be made between the binary circuit having 4 tubes, which, consequently, has $2^2=4$ states and the circuit according to the invention in which 2 tubes out of 4, are conductive and which admits of $$\frac{4!}{2!2!}=6$$

states, or of an arbitrarily smaller number out of these states, e.g. 5, there being no need to provide the circuit with additional or special means.

Other well-known counting circuits have for each state two tubes connected as a multivibrator. As an example may be mentioned a counting circuit having 5 states, so comprising 10 tubes to be divided into five parts which are cyclicly so connected that of each pair of tubes one tube is active for ⅘, the other for ⅕ of the period in which the circuit goes through all the 5 states. This is achieved by mutually connecting between the plate of one tube of a pair and the grid of the other differently dimensioned capacitor-resistor combinations. The transition of the multivibrator from the ⅕ to the ⅘ period initiates via a coupling the transition in an opposite sense of the cyclicly following multivibrator, etc.

These counting circuits only work in the frequency for which they are designed; the control frequency must not vary too much. The circuit according to the invention on the contrary can be controlled in a very wide frequency range; it is quite stably locked in each state.

The invention will be explained with reference to the annexed drawings.

Figure 1:
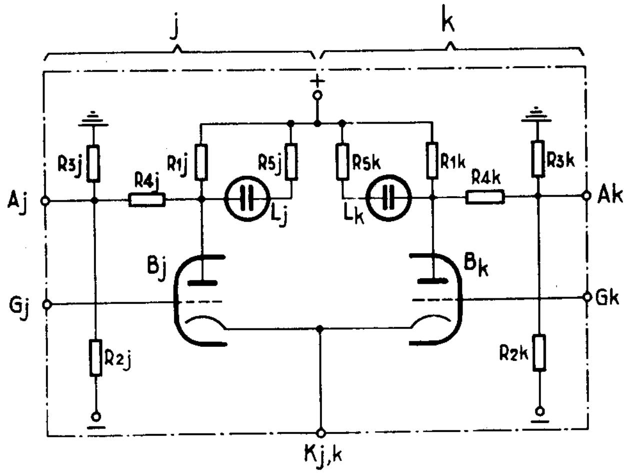
Fig. 1 shows the circuit of the counting tubes.

Fig. 1 shows the circuits of the counting tubes $j$ and $k$ of an $n$-fold counting circuit. The use of double triodes simplifies the construction, so that this figure is based on the use of these tubes. Single triodes can of course be used without difficulty. Tubes B$j$ and B$k$ are fed out of a positive voltage source via separate anode resistors R1$j$ and R1$k$. The two tube sections have the cathodes in common (K$jk$); as will appear in the further description the cathodes of all the counting tubes can be connected via a common resistor for obtaining a negative grid bias voltage and a stabilization to prevent the simultaneous conduction of a larger number of tubes than that for which the circuit has been designed. Negative grid bias may also be provided in other conventional manners of course. An indication can still be given by glow discharge tubes L$j$ and L$k$ in series with the high-ohmic resistors R5$j$ and R5$k$. In order to reduce the rather high voltage variations on the plates of the counting tubes approximately to the level at which the grid voltage must be to make the tube change over to the other state of conduction, potentiometers have been provided consisting of a resistor R4 between the plate and a common point a second resistor between ground and the said point and a third resistor between a negative voltage source and the said point. The not shown poles of the voltage source are thought to be in common and at ground potential. The grid terminal is designated by G, the plate terminal by A. It is to be observed that the potentiometers may also be omitted, the plate being directly connected to A then. In that case, however, all the grids must be connected to the negative voltage source via separate resistors. It is a drawback of this method that the rectifiers must have a higher reverse voltage rating, so pass a smaller reverse current, which renders the circuit more expensive.

Figure 2:
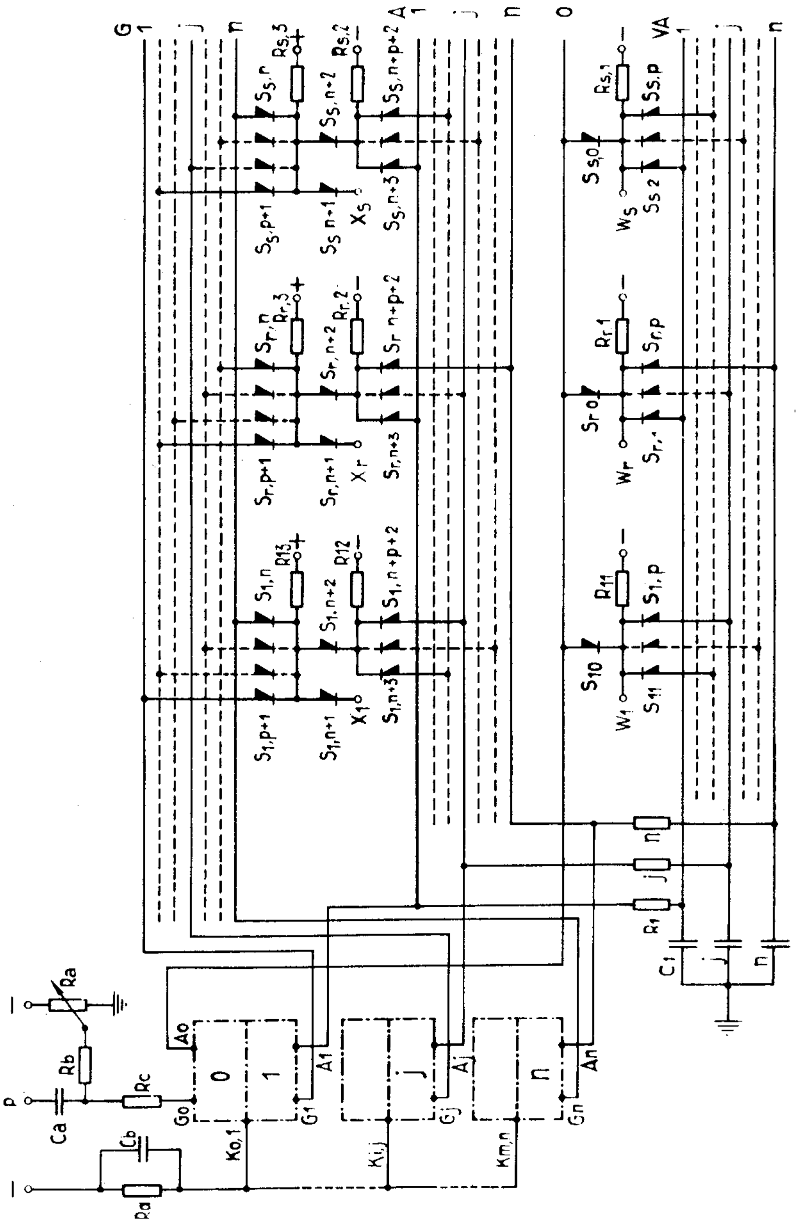
Fig. 2 shows in principle the counting circuit.

Fig. 2 gives the general diagram of an $n$-fold counting circuit according to the invention, in which $p$ tubes are simultaneously conductive.

Figure 3:
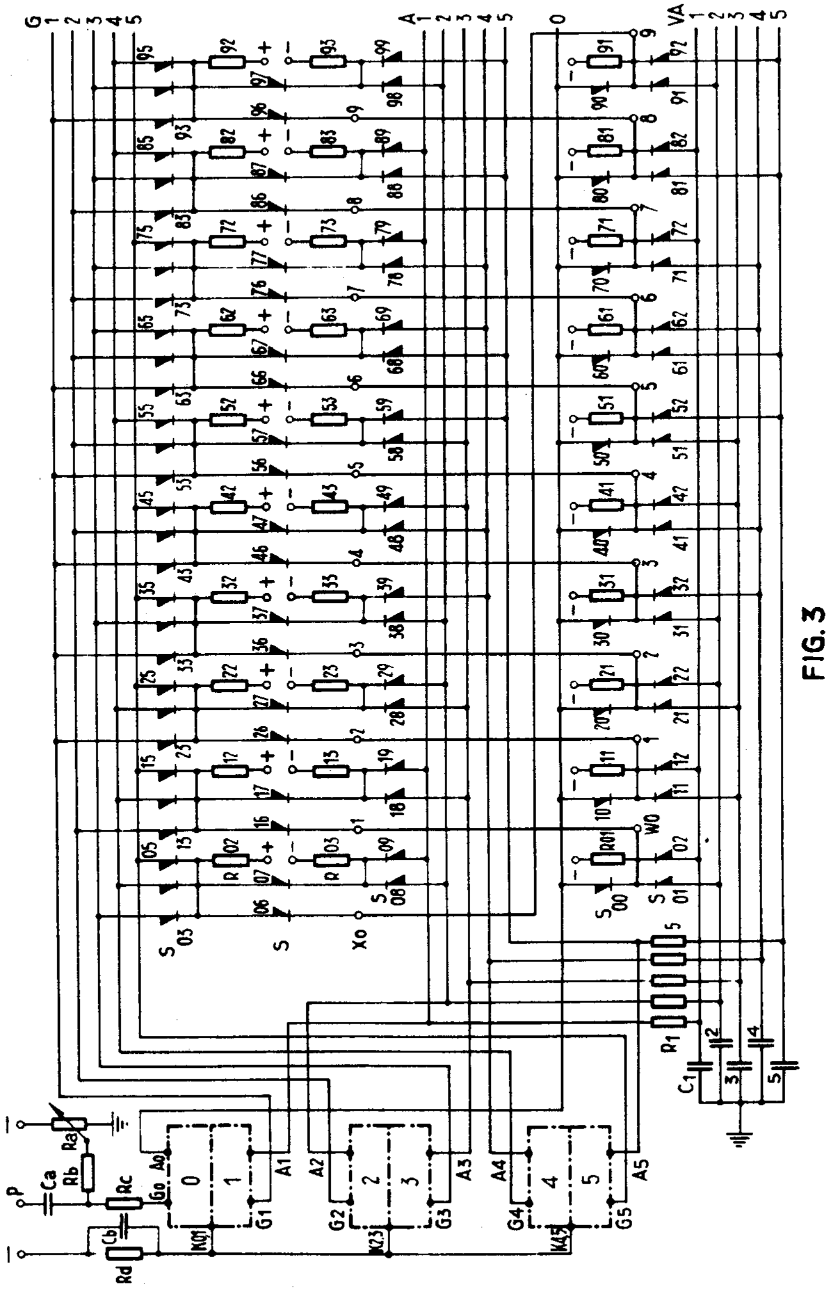
Fig. 3 shows an example of a fivefold counting circuit.

Some of the counting tubes 1 to $n$ are represented by boxes, the terminals of which are provided with reference letters as in Fig. 1. Tube 0 is used as a switching tube for switching on the circuit. The circuit O in Figures 2 and 3 is the same as the circuit $j$ which is set forth in Figure 1. Thus the anode of this tube is connected via a potentiometer in the manner of the circuits shown in Figure 1 to its associated terminal A which is in turn connected to the so-called switching-on conductor, and its grid circuit G is connected to the impulse generating circuit illustrated at P. For simplicity's sake the grid connections of the other counting tube circuits 1–$n$ have been continued to the right of the figure (G1 to G$n$), as well as the reduced anode conductors (A1 to A$n$) and the delayed anode conductors (VA1 to VA$n$), which are connected via delay networks R1—C1 to R$n$—C$n$ to the reduced anode conductors.

All the cathodes K$o$ to K$n$, including that of the switching tube, are connected via resistor R$d$ and capacitor C$b$ to the negative voltage source for obtaining negative grid bias.

The static locking is provided between the grids and the reduced anodes. To each desired state corresponds a locking element, of which three are shown, the 1st, the $r$th and the $s$th. Each locking element consists of a conductor connected on one hand via $p$ rectifiers or gate members (S$n$+3 to S$n$+$p$+2) to $p$ different reduced anode conductors A of distributor tubes. Thus a locking element is connected to that state of the counting in which the $p$ thus connected tubes are conductive. In this state only the lower connecting point of the said conductor is negative; in all the other cases a positive voltage is applied to at least one of the rectifiers, so that the said connecting point remains positive. The conductor is connected on the other hand, so at the top of Fig. 2, via rectifiers to the grids of the $n-p$ counting tubes, which are complementary to the said $p$ tubes. These rectifiers are designated by S$p$+1 to S$n$. They are so connected that the grids of the counting tubes follow the most negative of the thus impressed voltages. Consequently, only the locking element corresponding to a state of the counting circuit is given a negative voltage on its conductor, which voltage, consequently, is also applied to the grids of the $n-p$ tubes that are non-conductive in the relevant state.

So only the grids of the $p$ conducting tubes are supplied with a relatively high voltage, so that the circuit is stably locked. The rectifiers S$n$+1 and S$n$+2 can be left out of consideration; their function is connected with the switching-on of the circuit. If the circuit is used as a memory circuit, switching-on is left out of the question, and these rectifiers can be left out. The central connecting point of the locking element can then be connected with advantage via a high-ohmic resistor to the negative voltage source. In the reciprocal circuit (in which all the rectifiers are connected the other way round as regards their direction of conduction, so that $n-p$ tubes are conductive, the other $p$ being non-conductive) this high-ohmic resistor is connected to the positive voltage source. These resistors serve to reduce the inertness of the circuit as a result of the rectifier capacitances. If the switching-on is also taken into consideration, a rectifier (S$n$+2) is inserted in the central conductor of each locking element. This rectifier is the counterpart of another rectifier (S$n$+1), connected between the upper connecting point of the locking element and a terminal X. The more negative of the voltages applied to these two rectifiers appears at the upper connecting point and, consequently, at the grids of the $n-p$ tubes controlled by this connecting point. To make the circuit pass to the other state it is sufficient to apply for a shorter or longer time a negative voltage to the terminal X of the locking element corresponding to that state (and only to that terminal). The locking element corresponding to the initial state loses its controlling function in behalf of the controlled locking element and also after the control voltage has been taken away the circuit remains stably locked in its new state. This control voltage is obtained by means of the locking elements, of which three are shown too. There are as many switching elements needed as locking elements, to each state corresponding one locking element and one switching element. The fact is that that switching element, as well as the locking element, is connected via $p$ separate rectifiers (S1 to S$p$ in Fig. 2) to the reduced delay anode conductors VA of the $p$ distributor tubes that are conductive in the relevant state.

On the other hand the connecting points (W) of all the switching elements are connected via separate rectifiers or gate members (S10 in Fig. 2) to the switching conductor A$o$. So all the rectifiers here are connected to the low-ohmic anode circuits of counting tubes and switching tube, so that they have a controlling effect on the switching elements. They are so connected that the connecting points W follow the most negative voltage of the voltages applied to the said rectifiers.

The switching conductor A$o$ is normally kept at a positive voltage, e.g. by adjusting the potentiometer R$a$, so that the grid G$o$ of the switching tube is just kept negative and this tube is nonconductive. So none of the points W of the switching elements can become negative under these circumstances. If now the switching conductor is rendered negative e.g. by applying via point P and capacitor C$a$ (resistor R$o$) a positive impulse to the grid G$o$ of the switching tube, only the switching element corresponding to the considered initial state will become negative. If point W of this switching element, e.g. W1, is thought to be connected to point X of a locking element corresponding to another than the considered state, e.g. X$r$, the counting circuit passes in that case from the first to the $r$th position. For the time being the rectifiers S1, 1 to S1, $p$ remain negative through the effect of the delay networks R1—C1 to R$n$—C$n$.

In order to prevent the circuit from being switched on by two steps at a time, the interval during which the switching tube O is conductive must be smaller than the delay caused by the said delay circuit. This can e.g. be achieved by choosing correct values for resistor R$b$ and capacitor C$a$ with respect to the said delay networks. The connecting points W of the switching elements can with advantage be connected to the negative voltage source (positive for the reciprocal circuit) via high-ohmic resistors R1. So in the circuit provided as described with a switching device there are in the locking elements two connecting points separated by a rectifier (S$n$+2). The lower connecting point follows the more positive voltage, the upper connecting point following the more negative voltage. Consequently, the points have a high-ohmic leakage to the negative and positive voltage source, respectively (via R2 and R3, respectively).

In the reciprocal circuit the polarities are again reversed. The connection between points W of the switching elements and points X of the locking elements is quite arbitrary; therefore these connections are not shown in Fig. 2. If only part of the total number of states are used, only the switching and locking elements corresponding to these desired states are needed.

Fig. 3 gives the diagram of a circuit according to the invention having five counting tubes, of which two are simultaneously conductive. So the number of possible states amounts to ten. All ten locking and switching elements are shown. The connections between points W and points X are shown by dotted lines; they can be chosen quite arbitrarily. In the present case the counting circuit goes through all the ten states in the following order of sequence ($x$=conductive; $o$=non-conductive):

| Count: | Tubes 1, 2, 3, 4, 5 |
|---|---|
| 0 | x x o o o |
| 1 | x o x o o |
| 2 | o x x o o |
| 3 | o x o x o |
| 4 | o o x x o |
| 5 | o o x o x |
| 6 | o o o x x |
| 7 | x o o x o |
| 8 | x o o o x |
| 9 | o x o o x |

As noted above, the basic invention comprises a number of tubes "$n$" connected for operation to a number of stable states "$s$," "$p$" tubes being conductive and $n-p$ tubes being nonconductive in each state. Thus in the specific arrangement shown in Figure 3 using five counting units ($n$—5), two tubes are rendered conductive at a time ($p-2$), and three tubes are nonconductive ($n-p-3$).

In such arrangement the blocks 1—5 represent the counting tubes 1—5 and their associated circuitry. The blocks in Figure 3 are paired (0—1, 2—3, 4—5) so that double triodes may be readily employed to represent two stages, if desired. As more fully shown in Figure 1, each of the tubes or stages 0—5, may comprise a triode section having an anode A, a grid G and cathode K. The anode may be connected over an associated voltage divider to terminal A, and the grid is connected to terminal G. The cathodes K are connected to a common source of negative voltage and the anodes are connected to a source of B+. The conductivity of each tube section is therefore determined in the conventional manner by the value of the signal applied to the grid terminal G for such tube. In the present embodiment, two tubes are conductive and three are nonconductive in each state, whereby ten states or counts are available. Advancement of the members to each successive state is accomplished by coupling successive incoming impulses over the input lead P to the switching tube O.

More specifically, impulse input circuit P is connected over the illustrated control circuit to the grid circuit G of the switching tube O. Potentiometer R*a* is adjusted so that the grid G*o* of the switching tube is just sufficiently negative to maintain the switching tube nonconductive. Accordingly, the count advancing conductor which is connected to the anode of the switching tube over output terminal A*o* is normally at a positive voltage.

It is apparent that whenever a positive pulse is applied to the grid G*o* of the switching tube O over point P and capacitor C*a* and resistor R*o*, tube O will conduct and a negative pulse is transmitted to the switching elements over conductor A*o*.

As noted above one switching set and one locking set are provided for each different state. The first switch set S00—S01 as shown in Figure 3, is connected to correspond to the zero state, and operates whenever the chain is to advance from a zero count to count 1. Each switching set, such as S00—S01 basically comprises a first rectifier, such as S00 connected between the control conductor A*o* and a negative battery source; and a pair of rectifiers, such as S01 and S02, each of which is conductive in the particullar state to which it corresponds. Thus, since the first switching set corresponds to count zero, and the chart above indicates that tubes 1 and 2 are conductive when such count is registered, the rectifiers S01 and S02 are connected over delay networks R1—C1 and R2—C2 and terminals A1—A2 to the anodes of tubes 1 and 2. In a similar manner, each of the further switching sets S10—S12; S20—S22, etc., are connected between the control conductor A*o* and the "*p*" tubes corresponding to the particular state represented by the switching set O.

Thus, if the chain is at count 0 (tubes 1 and 2 conducting), it will be apparent that a negative bias is applied to the cathodes of rectifier S01 and S02 to render same conductive. It is further noted that of the ten switching sets, only the first switching set has both of its two lower rectifiers S01 and S02 biased to conduct when the count is at 0. With the counting circuit in the zero state, therefore, the first switching set is "conditioned" for operation, responsive to the coupling of the next count advancing pulse to the control conductor A*o*.

The switching point W for each switching set follows the least negative voltage which is applied thereto by the rectifiers which is the case whenever all three of the rectifiers are conducting. Thus, when the count is at zero and the control conductor A*o* is momentarily driven negative by the switching tube O responsive to receipt of an input impulse over the input circuit *p*, all the input rectifiers connected to the control conductor will be biased to conduct, but only the three rectifiers in the first switching set will be conductive, and a switching pulse appears only at switching point W*o*. By analogy it will be seen that when the chain is at count one, the second switching set (S10, 11, 12) will be in the conditioned state, and a pulse on the common control conductor A*o* will effect operation of the second switching set to provide a switching pulse at switching point W1, etc.

The counting circuit further includes a locking set for each switching set. The locking element for state 0, for example, comprises a control conductor X*o* including a rectifier, such as S06, connected over rectifier S03—S05 to the grids of the $n-p$ (nonconductive) tubes associated with state 0 (tubes 345-Chart). The rectifiers S03, S05 are coupled over a resistor R02 to positive potential. A second set of rectifiers S08, S09 are connected to the anodes of the *p* (conductive) tubes associated with state 0 (tubes 1 and 2) and over resistor R03 to negative potential. Coupling rectifier is connected between the rectifier set S03—S05 and S08, S09.

Since tubes 1 and 2 are conductive whenever the circuit is operated to state or count zero, the interconnected rectifiers S08 and S09 of the associated locking set are also conductive. With rectifiers S08, S09 conductive a more negative voltage is applied to the rectifiers, such as S06, 07 of the locking circuit, and, since the rectifiers S03, S04, S05 are connected to follow the negative pulse, a negative voltage appears at the grids of the $n-p$ tubes (tubes 3, 4, 5) which are controlled by the rectifiers of the energized locking set. The grids of the *p* conducting tubes are supplied with a relatively high voltage so that the circuit is stably locked in a state as operated thereat.

The anodes of the "*p*" tube for a given count are connected over a delay circuit to preselect the next switching set to be energized as the next count advancing signal is received. Thus, "*p*" tubes 1 and 3, when the circuit is at zero count, are connected over delay network R1, C1, R3, C3 to the switching set S10—S12 which represents count one, and preconditions such set for operation.

Assuming by way of example, that the circuit is locked in the zero count state, it will be apparent from the above description that counting members or tubes 1 and 2 will be conductive with the output of gates 1 and 2 controlling rectifiers S08—S09 in the locking set associated with the zero count to enable rectifier S07 and in turn rectifiers S03—S05 to maintain gates 3, 4 and 5 nonconductive. Transfer rectifier S06 of the locking element will be nonconductive in that the pulse received over switching conductor X*o* has been previously removed. Additionally the output circuits of the conductive tubes 1, 2 are connected over delay network R1, C1, R2, C2 to the switching set S01, S02 which are associated with the zero count and which are operative as the next pulse is received to couple a switching pulse to the locking circuit for the count one state.

It will be observed that the first switching element S00—S02 is the only switching element of the group which is thus pre-conditioned by the tube members at this time. As the next count advancing signal is received over conductor O, therefore, only the switching set S00—S02 will have all three rectifiers of its set in the conductive condition, and only such set of the ten sets will extend over its associated switching terminal W*o* to its associated locking circuit. The negative control pulse thus coupled to X1 controls rectifier S16 which in turn controls the three rectifiers S13—S15 connected to the $n-p$ tubes of its assigned state to drive such gates to the nonconductive condition (tubes 2, 4 and 5). As tube 2 of the group is rendered non-conductive with tubes 4 and 5, it is effective at its anode A2 to couple a signal of more positive potential to rectifier S08 to thereby remove the lock from the rectifier S08 which is associated with the locking circuit for the zero count. As a result, rectifier S07 responsively interrupts the lock for the $n-p$ tubes associated with the zero count (tubes 3, 4, 5).

As the lock is thus removed from these tubes, the tube 3 becomes conductive (tubes 2, 4 and 5 being held by locking element 1 which is effective at this time), and with tube 1, is effective at anodes A1, A3 respectively to enable rectifiers S18—S19 for the first locking circuit, which in turn enable rectifier S17 to lock rectifiers S13—S15. As the incoming pulse received over terminal 1 from the first switching element S0*o*, S02 is now terminated, the circuit will be maintained locked in the state which represents count 1 by the "*p*" conductive tubes for count 1.

The output of the *p* conductive tubes (1 and 3 during the registration of count 1) is also applied over delay network R1, C1; R3, C3 and therefore to conductors VA1, VA3, and rectifiers S11, S12 of the second switching element, whereby the second switching element is prepared for operation responsive to coupling of the next incoming impulse over the common control conductor O.

The operation of the circuit to represent successive counts responsive to the receipt of successive incoming impulses will be apparent from the foregoing description. It will be understood that although the connection between the switching points W and locking points X are shown in solid lines to teach a specific embodiment, the illustrated connections are arbitrary, and may be interchanged as desired to effect a different pattern of operation without departing from the spirit of the invention.

While we have illustrated and described what we regard to be the preferred embodiment of our invention, nevertheless it will be understood that such is merely exemplary and that numerous modifications and rearrangements may be made therein without departing from the essence of the invention, we claim:

1. An electronic counting device for counting incoming impulses received over an input circuit comprising a total number of "*n*" counting stages connected for operation in determined combinations to represent different counts, each stage including only a single counting member having a single conducting section, control means for rendering a predermined "*p*" number of said stages conductive and an $n-p$ number of said stages non-conductive in each of said combinations, *p* and $n-1$ being greater than unity in each of said combinations, and switching means connected to said control means to control same to energize said counting stages to said different states responsive to receipt of successive count advancing signals, said control means being connected to effect operation of each counting member to the conductive state with each of the other counting members at least once in the different ones of said combinations.

2. An electronic counting chain comprising a total number "*n*" counting members connected for operation in different combinations to indicate different counts including a plurality of control means, each control means being operative as energized to render a predetermined set of a "*p*" number of member conductive and an $n-p$ number of members non-conductive and being connected to thereby provide $$\frac{n!}{p!(n-p)!}$$

counts with *n* counting members, *p* and $n-1$ being greater than unity in each of said combinations, and switching means operative to selectively energize said control means in the enablement of the counting members in said different combinations.

3. An electronic counting device comprising a total number of "*n*" counting members connected for operation in different combinations to indicate different counts including control means connected to render a first group of a *p* number of members conductive and a second group of an $n-p$ number of members non-conductive in each combination, *p* and $n-p$ being greater than unity in each of said combinations to provide $$\frac{n!}{p!(n-p)!}$$

count representative states, and a plurality of locking means, the number of locking means being equivalent to the number of different combinations, each of which locking means is connected to operate only responsive to receipt of a predetermined one of said counts, different locking means being connected to operate for different counts, including means in each locking means operatively controlled by one group of the counting members in each combination as operated thereto to provide a locking signal for each of the members of the other of said groups in the combination to maintain each of the counting members in the other of said groups of its combination in a stably locked condition.

4. An electronic counting device comprising a total number of "*n*" counting tubes connected for operation in different combinations to represent different counts, an arbitrary number of *p* tubes being in one condition of conductivity and an $n-p$ number of tubes being in a second condition of conductivity in each of said states, *p* and $n-p$ each being greater than unity, each counting tube having at least an anode, a grid and a cathode, a control circuit connected to each anode, a control circuit connected to each grid, a plurality of locking elements, the number of locking elements being equivalent to the number of counts, different locking elements being connected to represent different counts and each locking element including a *p* number of rectifier members, means connecting the *p* number of rectifier members of each locking element to the control circuit for the anodes of the *p* counting tubes in said one condition for its count, the control circuits for the different sets of locking elements being thus connected to different anode combinations, an $n-p$ number of rectifier members in each locking element, and means for connecting the $n-p$ rectifier members of a locking element to the control circuit for the grids which are in said second condition for the $n-p$ counting tubes of its count, the $n-p$ rectifier sets for the different locking elements being thus connected to different grid combinations.

5. An electronic counting device comprising a plurality of *n* counting members connected for operation in different combinations to represent different counts in a sequence, an arbitrary number of *p* tubes being in one condition of conductivity, and an $n-p$ number of tubes being in a second condition of conductivity in each of said combinations, *p* and $n-p$ each being greater than unity, a plurality of switching elements, the total number of switching elements being equivalent to the number of said combinations, means connecting each of said switching elements to represent only one predetermined count in the sequence, different switching elements being connected to represent different counts, a control circuit connected common to said switching elements for simultaneously applying a count advancing signal to each of said switching elements, control means controlled by each switching element as operated to effect operation of said counting members in the combination represented by said switching element, and means controlled by said counting members in each count to precondition only the one of the switching elements of said plurality which is preassigned to represent the succeeding count in the sequence for operation responsive to the receipt of the next count advancement.

6. An arrangement as set forth in claim 5 in which said control means includes a plurality of locking elements which is equivalent in number to the number of switching elements, and means for connecting each locking element to only one of said switching elements, different locking elements being connected to different switching elements, and means in each locking element operative to initiate operation of said members in the particular one of said combinations associated with its switching element and to lock same in such combination responsive to the operation of the counting members to said combination.

7. An electronic counting device comprising a plurality of counting members connected to operate in different combinations in a predetermined sequence to represent a plurality of different counts which is larger than two, a control circuit over which count advancing signals are received, a plurality of switching elements, the number of switching elements being equivalent to the number of counts, each of which is connected to represent only one predetermined one of said counts, different switching elements being operated to represent different counts, means operatively controlled by each switching element responsive to the receipt of a count advancing signal to effect switching of said counting members to the combination representative of the one of said counts represented thereby, and means controlled by said counting members in each combination to precondition only the plurality of one of the switching elements which is associated with the subsequent count in the sequence for operation in response to receipt of the succeeding incoming impulses, including means for delaying preconditioning of the succeeding switching element until subsequent to the removal of the count advancing signal from the control circuit.

8. An electronic counting device comprising a plurality of counting members connected for operation in different combinations to represent different counts, a control circuit over which count advancing signals are received, a plurality of switching elements, the number of switching elements being equivalent to the number of counts, each of which switching elements is connected to represent only one count and which is operatively controlled by a signal received over said control circuit to initiate switching of said counting members to the combination which represents the one count preassigned thereto, different switching elements being preassigned to prepare said counting members to represent different counts, means controlled by said counting members in each combination for preselecting the one of the switching elements which is operative in the succeeding operation including a signal output circuit for each counting member, and means for connecting a different plurality of the output circuits of the counting members to each of the different switching elements to thereby effect preselection of a different one of said switching elements in each of the different count representing combinations.

9. An arrangement as set forth in claim 8 in which each counting member is operated between two conditions to extend alternatively a first signal and a second signal over its output circuit, and means in each switching element operative to precondition such element for operation whenever said first signal is applied to each of the several output circuits connected thereto.

10. An electronic counting device comprising a plurality of counting members connected for operation in different combinations in a predetermined sequence to represent correspondingly different counts, an input circuit over which count advancing signals are received, a plurality of switching elements equivalent in number to the number of counts connected to said input circuit, different switching elements being connected to represent different counts, a plurality of locking elements equivalent in number to the number of switching elements, each of which is operative to lock the counting members in a different one of the combinations as operated thereto, means connecting each switching element to operate an individual one of the locking elements responsive to receipt of its associated count signal, each locking element being connected to operate said counting members to the combination represented by its switching element, and means controlled by said counting members in their operation to a state to couple an effective preconditioning signal only to the one of the switching elements which represents the subsequent count in the sequence and simultaneously a locking signal to the effective one of the locking elements.

11. An electronic counting device comprising a plurality of counting members operative in different combinations to represent different counts, a plurality of locking circuits equivalent in number to the number of counts, each of which includes means connected to transfer said counting members to the one particular one of the combinations to be represented thereby, different locking circuits being connected to operate the counting members to different ones of said combinations, and a locking set for maintaining the counting members in a combination as operated thereto; and circuit enabling means controlled by a plurality of said counting members as operated in a combination to couple an effective energizing circuit only to the locking set which is associated with the one of the locking circuits for the combination represented by the counting members.

12. An arrangement as set forth in claim 11 in which each counting member comprises a tube member, and each locking circuit comprises an input and an output circuit, means operative with receipt of a signal over its input circuit to extend signals to the counting tube members over its output circuit to effect operation thereof to the state preassigned thereto, and means connected to the counting members to extend operating signals to said circuit enabling means only as the tubes are operated to the state represented thereby.

13. An electronic counting device comprising a plurality of tube members operative in different combinations to represent different circuit states, a plurality of locking circuits, each of which includes a plurality of rectifier members connected to simultaneously control a plurality of the tube members to operate to the condition for the state represented by the locking circuit, the rectifier sets for different locking circuits being connected to operate the tube members to different preassigned states, and a set of locking rectifier members for effecting locking of said tubes in a preassigned state as operated thereto; and signal coupling means controlled by a plurality of said tube members as operated to a state to extend effective operating signals only to the set of rectifier members for the operated one of said locking circuits.

14. An electronic counting device comprising an "$n$" number of tube members operative in different combinations to represent different circuit states, each circuit state having $p$ number of tubes in the conductive state and an $n-p$ number of tubes in the non-conductive state, each tube having at least one control element; a plurality of locking circuits, each of which is connected to effect operation of certain ones of the tube members to a predetermined condition and thereby operation of the tube members to a preassigned one of the states, different locking circuits being preassigned to control operation of the tube members to a different one of said states, each locking circuit including an $n-p$ number of rectifiers connected to the control elements of the $n-p$ tube members which are to be rendered non-conductive responsive to receipt of a control signal by the locking circuit, and a set of locking rectifiers, each of which is connected for operation by an associated one of the $p$ tube members which are rendered conductive responsive to operation of its associated locking circuit; and means operatively controlled by the set of locking rectifiers to maintain the $n-p$ number of rectifiers operated subsequent to termination of the control signal, and thereby the tube members stable in the state to which the tube members are operated and enablement thereby of the locking rectifiers associated with such state.

15. In an electronic counting device comprising five stages, each stage consisting of only one counting member, means for connecting said counting members for operation in different combinations to represent ten different counts comprising control means operative to render two counting members conductive and three counting members non-conductive in each state, different pairs of counting members being rendered conductive in each state, and switching means for energizing said control means in the enablement of said counting members to represent different counts responsive to the receipt of successive count signals.

16. An electronic counting device comprising a number of "$n$" counting members connected for operation in different combinations, each combination representing a particular count and consisting of a $p$ number of tubes in the conductive state and $n-p$ number of tubes in the non-conductive state, $p$ and $n-p$ being greater than unity in each of said combinations, a plurality of locking circuits, each of which is assigned to represent a particular count and which is operative to energize the tubes in the combination which represents its assigned count responsive to the coupling of a control signal thereto, different locking circuits being preassigned to energize said tube members to different preassigned combinations, each locking circuit comprising a set of $n-p$ gate members connected to operate to cut-off the $n-p$ counting members of its assigned combination which are to be non-conductive, and means for maintaining said $n-p$ counting members in the non-conductive condition subsequent to the termination of said control signal including a number of $p$ locking gate members connected to the $p$ conductive tubes of its assigned combination for operation thereby.

17. In an electronic counting device comprising a number of "$n$" counting members connected for operation in different combinations to represent different counts responsive to the receipt of count advancing signals over an input circuit, each combination having a $p$ number of counting members in the conductive state and an $n-p$ number of counting members in the non-conductive state, $p$ and $n-p$ being greater than unity in each of said combinations, control means, a plurality of switching circuits, each switching circuit being connected to prepare said control means to operate said counting members to represent a preassigned one of said counts, different switching circuits being assigned to prepare the control means to provide a different one of said counts, each switching circuit comprising a $p$ number of gate members connected to the output circuits of the plurality of $p$ tubes of a combination in the conductive state for control thereby, at least one additional gate member connected to said input circuit, and an output circuit connected to couple a control signal to said control means to effect the operation of said counting member to the count assigned thereto only responsive to the energization of each gate member of its associated switching circuit.

References Cited in the file of this patent

UNITED STATES PATENTS

| | | |
|---|---|---|
| 2,540,442 | Grosdoff | Feb. 6, 1951 |
| 2,644,887 | Wolfe | July 7, 1953 |
| 2,719,227 | Gordon | Sept. 27, 1955 |
| 2,719,228 | Auerbach | Sept. 27, 1955 |
| 2,735,005 | Steele | Feb. 14, 1956 |
| 2,771,550 | Hampton | Nov. 20, 1956 |
| 2,773,983 | Baker et al. | Dec. 11, 1956 |

BEST AVAILABLE COPY

UNITED STATES PATENT OFFICE

CERTIFICATE OF CORRECTION

Patent No. 2,922,034 January 19, 1960

Hendrik Cornelis Anthony Van Duuren et al.

It is hereby certified that error appears in the printed specification of the above numbered patent requiring correction and that the said Letters Patent should read as corrected below.

Column 7, line 34, for "determined" read -- different predetermined --; line 52, for "member" read -- members --; column 9, line 13, strike out "plurality of" and insert the same before "switching" in line 14, same column; column 10, line 64, after "operated" insert a period; same line 64 and line 65, strike out "and enablement thereby of the locking rectifiers associated with such state."

Signed and sealed this 23rd day of August 1960.

(SEAL)
Attest:

KARL H. AXLINE
Attesting Officer

ROBERT C. WATSON
Commissioner of Patents